(12) United States Patent
Rajapandiyan et al.

(10) Patent No.: US 12,395,403 B2
(45) Date of Patent: Aug. 19, 2025

(54) DYNAMIC CONFIGURATION OF CUSTOMER PREMISES EQUIPMENT

(71) Applicant: Nokia Solutions and Networks Oy, Espoo (FI)

(72) Inventors: Karthick Rajapandiyan, Chennai (IN); Suresh Babu Addala Gajapathy, Chennai (IN); Vinodh K R, Robertsonpet (IN); Mahendar Kamalchand, Tiruvallur (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/512,355

(22) Filed: Nov. 17, 2023

(65) Prior Publication Data
US 2024/0179056 A1 May 30, 2024

(30) Foreign Application Priority Data
Nov. 24, 2022 (IN) .............................. 202241067724

(51) Int. Cl.
*H04L 41/0816* (2022.01)
*G06F 9/4401* (2018.01)
*H04L 41/08* (2022.01)

(52) U.S. Cl.
CPC ........ *H04L 41/0816* (2013.01); *G06F 9/4416* (2013.01); *H04L 41/0886* (2013.01)

(58) Field of Classification Search
CPC ............. H04L 41/0809; H04L 41/0816; H04L 41/0876; H04L 41/0886; H04L 41/18; H04L 65/1069; G06F 9/4416

USPC ......................................................... 709/221
See application file for complete search history.

(56) References Cited

U.S. PATENT DOCUMENTS

2013/0268578 A1* 10/2013 Bose ................... H04L 65/1069
709/203
2018/0034698 A1* 2/2018 Perez .................. H04L 41/0886

FOREIGN PATENT DOCUMENTS

WO WO-2011117193 A2 * 9/2011 ........... H04L 41/042

OTHER PUBLICATIONS

Search Report for European Application No. 23211352.2 dated Mar. 26, 2024.
"T01020006270701MSWE_Y2014-clean_vl", ITU-T Draft; Study Period 2005-2008, International Telecommunication Union, Geneva; CH, vol. Study Group 13, Apr. 8, 2008 (Apr. 8, 2008), pp. 1-50, XP017522818, [retrieved on Apr. 8, 2008].

* cited by examiner

*Primary Examiner* — Glenford J Madamba
(74) *Attorney, Agent, or Firm* — Harness, Dickey & Pierce, P.L.C.

(57) ABSTRACT

Techniques for dynamically configuring a Customer Premises Equipment (CPE) are described. In an example, identification parameters including at least one of a CPE identifier and a network identifier are transmitted to a Cloud Onboarding Server (COS). In response to transmission of the identification parameters, an operator specific configuration corresponding to the identification parameters is received from the COS, where the operator specific configuration is indicative of operational parameters associated with a network operator. The CPE is then configured based on the operator specific parameters.

18 Claims, 6 Drawing Sheets

DYNAMIC CONFIGURATION OF CUSTOMER PREMISES EQUIPMENT

CROSS-REFERENCE TO RELATED APPLICATIONS

This application claims priority to and the benefit of Indian Patent Application number 202241067724 filed on Nov. 24, 2022, the entire contents of each of which are incorporated herein by reference.

TECHNICAL FIELD

The present subject matter relates, in general, to Customer Premises Equipment (CPE), and in particular, to techniques for facilitating dynamic configuration of CPEs.

BACKGROUND

CPE are typically utilized for accessing services provided by a network operator at a customer premise. The CPE is usually connected to a telecommunication circuit of the network operator at a demarcation point, where the demarcation point is a physical point where a public network of the network operator ends, and private network of a customer begins.

SUMMARY

This summary is provided to introduce concepts related to dynamic configuration of CPEs. This summary is not intended to identify essential features of the claimed subject matter nor is it intended for use in determining or limiting the scope of the claimed subject matter.

In an example, a method implemented on a CPE is described. In operation, identification parameters comprising at least one of a CPE identifier and a network identifier are transmitted to a Cloud Onboarding Server (COS). In response to transmission of the identification parameters, an operator specific configuration corresponding to the identification parameters is received, where the operator specific configuration is indicative of operational parameters associated with the network operator. The CPE is then configured based on the operator specific configuration.

In another example, a method implemented on a COS is described. In operation, identification parameters comprising at least one of a CPE identifier and a network identifier are received from a CPE. In response to reception of the identification parameters, an operator specific configuration corresponding to the identification parameters is determined, where the operator specific configuration is indicative of operational parameters associated with the network operator. The operator specific configuration is then transmitted to the CPE.

In yet another example, a CPE is described. In an example, the CPE includes a communication engine to transmit, to a COS, identification parameters comprising at least one of a CPE identifier and a network identifier. The communication engine then receives an operator specific configuration corresponding to the identification parameters, where the operator specific configuration is indicative of operational parameters associated with the network operator. The CPE further includes a configuration engine to configure the CPE based on the operator specific configuration.

In another example, a COS is described. In an example, the COS includes a reception engine to receive, from a CPE, identification parameters comprising at least one of a CPE identifier and a network identifier. The COS further includes a determination engine coupled to the reception engine to determine an operator specific configuration based on the identification parameters, where the operator specific configuration is indicative of operational parameters associated with the network operator. A transmission engine coupled to the determination engine is further included in the COS, where the transmission engine is to transmit the operator specific configuration to the CPE.

DETAILED DESCRIPTION

CPEs are usually manufactured to fulfil specific operational requirements of a network operator. To ensure the fulfilment of such operational requirements, operator specific configuration corresponding to a network operator is pre-provisioned in the CPE during manufacturing of the CPE. When the CPE is powered on at a customer premise, the CPE utilizes the operator specific configuration to connect to an auto configuration server (ACS) of the network operator for deployment of the CPE at the customer premise.

However, pre-provisioning operator specific configuration corresponding to different network operators in different CPEs increases time and complexity involved in manufacturing and commissioning of the CPEs.

According to examples of the present subject matter, techniques for dynamically configuring CPEs are described.

In an example, the technique involves providing a CPE with operator specific configuration corresponding to a network operator during deployment of the CPE at a customer premise instead of pre-provisioning operator specific configuration during manufacturing of the CPE. Configuring the CPEs with the operator specific configuration dynamically during deployment reduces the time and complexity involved in pre-provisioning different CPEs with different operator specific configurations during manufacturing, thereby reducing the time and complexity involved in manufacturing of the CPEs.

In an example of the present subject matter, upon bootup of the CPE at a customer premise, identification parameters comprising at least one of a CPE identifier and a network identifier are transmitted over a communication network to a Cloud Onboarding Server (COS). In an example, upon receiving the identification parameters from the CPE, an operator specific configuration corresponding to the identification parameters is identified at the COS, where the operator specific configuration is indicative of operational parameters associated with the network operator. The operator specific configuration is then transmitted from the COS to the CPE. The CPE is then configured based on the operator specific configuration.

The above techniques are further described with reference to FIG. 1 to FIG. 6. It should be noted that the description and the figures merely illustrate the principles of the present subject matter along with examples described herein and should not be construed as a limitation to the present subject matter. It is, thus understood that various arrangements may be devised that although not explicitly described or shown herein, embody the principles of the present subject matter. Moreover, all statements herein reciting principles, aspects, and implementations of the present subject matter, as well as specific examples thereof, are intended to encompass equivalents thereof.

Figure 1:
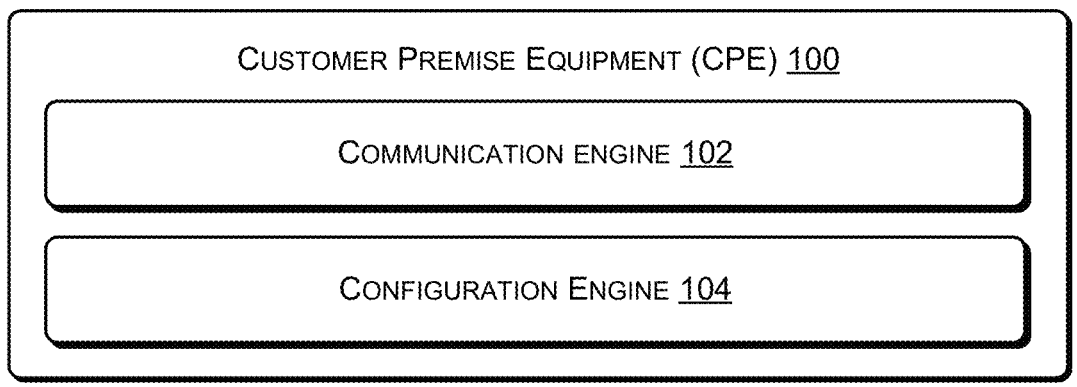
FIG. 1 illustrates schematic of a CPE for facilitating dynamic configuration of the CPE, in accordance with an example of the present subject matter.

FIG. 1 illustrates schematic of a CPE 100, in accordance with an example of the present subject matter. Examples of CPE 100 may include, but are not limited to, routers such as, Digital Subscriber Line (DSL) modems and cable routers; Optical Network Terminal (ONT); private branch exchange (PBX) switching equipment; and key and hybrid telephone systems.

In an example, the CPE 100 comprises a communication engine 102 that may transmit identification parameters to a COS (not shown). The identification parameters may comprise a CPE identifier, a network identifier, or a combination thereof. Examples of the CPE identifier may include, but are not limited to, serial number of the CPE, a model number of the CPE. Further, examples of the network identifier may include, but are not limited to, an internet protocol (IP) subnet associated with the network operator, network operator identifier such as, Mobile Country Code (MCC) and Mobile Network Code (MNC), and Wi-Fi neighbour information.

In response to transmission of the identification parameters, the communication engine 102 may receive an operator specific configuration corresponding to the identification parameters. The operator specific configuration may indicate operational parameters associated with the network operator. In an example, the communication engine 102 may receive the operator specific configuration from the COS.

The CPE 100 further comprises a configuration engine 104 that may configure the CPE 100 to connect to a communication network of the network operator based on the operator specific configuration.

Figure 2:
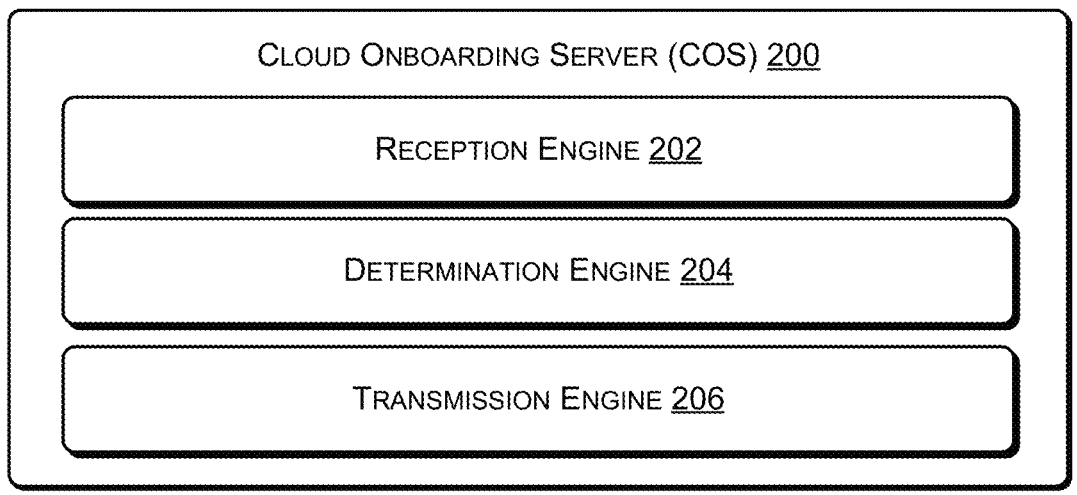
FIG. 2 illustrates schematic of a Cloud Onboarding Server (COS) for facilitating dynamic configuration of the CPE, in accordance with an example of the present subject matter.

FIG. 2 illustrates schematics of a COS 200 for facilitating dynamic configuration of the CPE, in accordance with an example of the present subject matter. In an example, the COS may be a cloud server hosted and maintained by a manufacturer of the CPEs.

In an example, the COS 200 may include a reception engine 202 that may receive identification parameters comprising at least one of a CPE identifier and a network identifier. Examples of the CPE identifier may include, but are not limited to, serial number of the CPE, a model number of the CPE. Further, examples of the network identifier may include, but are not limited to, an internet protocol (IP) subnet associated with the network operator, network operator identifier such as, Mobile Country Code (MCC) and Mobile Network Code (MNC), and Wi-Fi neighbour information.

The reception engine 202 may receive the identification parameters from the CPE, such as the CPE 100.

The COS 200 may further include a determination engine 204 coupled to the reception engine 202, where the determination engine 204 may determine an operator specific configuration based on the identification parameters. In an example, the operator specific configuration is indicative of operational parameters associated with the network operator.

Further, the COS 200 may include a transmission engine 206 coupled to the determination engine 204. In an example, once the determination engine 204 determines the operator specific configuration based on the identification parameters, the transmission engine 206 may then transmit the operator specific configuration to the CPE.

Figure 3:
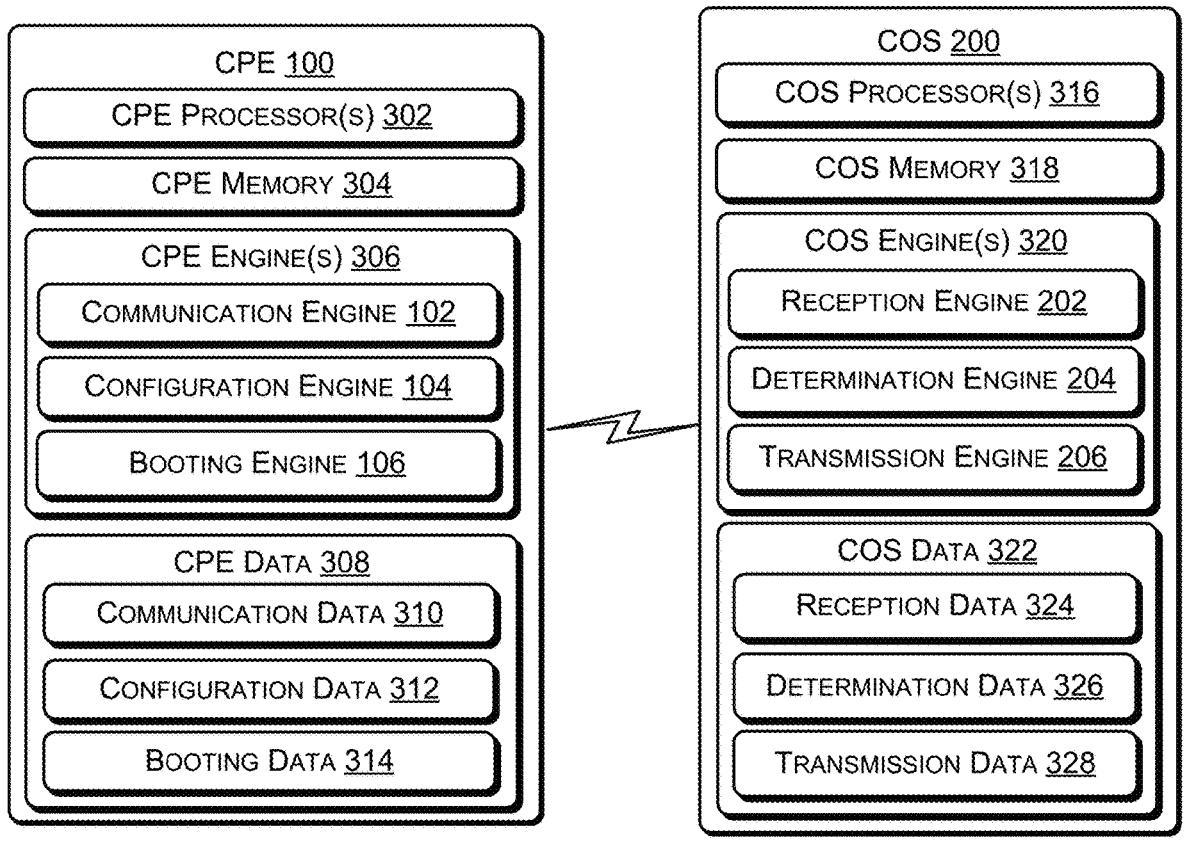
FIG. 3 illustrates the CPE communicatively coupled to the COS for facilitating dynamic configuration of the CPE, in accordance with an example of the present subject matter.

FIG. 3 illustrates the CPE 100 communicatively coupled to the COS 200, in accordance with an example of the present subject matter.

In an example, the CPE 100 may be communicatively coupled to the COS 200 via a communication network (not shown). The communication network may be a wireless or a wired network, or a combination thereof. The communication network can be a collection of individual networks, interconnected with each other and functioning as a single large network. Examples of such individual networks include, but are not limited to, Global System for Mobile communication (GSM) network, Universal Mobile Telecommunications System (UMTS) network, Long Term Evolution (LTE) network, personal communications service (PCS) network, Time-division multiple access (TDMA) network, Code-Division Multiple Access (CDMA) network, next-generation network (NGN), public switched telephone network (PSTN), and Integrated Services Digital Network (ISDN). Depending on the terminology, the communication network includes various network entities, such as gateways and routers; however, such details have been omitted to maintain the brevity of the description.

The CPE 100 may include CPE processor(s) 302 and a CPE memory 304 coupled to the CPE processor 302. The functions of functional block labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, standard and/or custom, may also be included.

The CPE memory 304 may include any computer-readable medium including, for example, volatile memory (e.g., RAM), and/or non-volatile memory (e.g., EPROM, flash memory, etc.).

The CPE 100 may further include CPE engine(s) 306, where the engines 306 may include the communication engine 102, the configuration engine 104 coupled to the communication engine 102, and the booting engine 106 coupled to the communication engine 102 and the configuration engine 104. In an example, the engines 306 may be implemented as a combination of hardware and firmware. In examples described herein, such combinations of hardware and firmware may be implemented in several different ways. For example, the firmware for the engine may be processor executable instructions stored on a non-transitory machine-readable storage medium and the hardware for the engine may include a processing resource (for example, implemented as either a single processor or a combination of multiple processors), to execute such instructions.

In the present examples, the machine-readable storage medium may store instructions that, when executed by the processing resource, implement the functionalities of the engine. In such examples, the CPE 100 may include the machine-readable storage medium storing the instructions and the processing resource to execute the instructions. In other examples of the present subject matter, the machine-readable storage medium may be located at a different location but accessible to the CPE 100 and the CPE processor 302.

The CPE 100 may further include CPE data 308, that serves, amongst other things, as a repository for storing data that may be fetched, processed, received, or generated by the communication engine 102, the configuration engine 104, and the booting engine 106. The CPE data 308, among other data, may include communication data 310, configuration data 312, and booting data 314. In an example, the CPE data 308 may be stored in the CPE memory 304.

The COS 200 may include COS processor(s) 316 and a COS memory 318 coupled to the COS processor 316. The functions of functional block labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, standard and/or custom, may also be included.

The COS memory 318 may include any computer-readable medium including, for example, volatile memory (e.g., RAM), and/or non-volatile memory (e.g., EPROM, flash memory, etc.).

The COS 200 may further include COS engines 320, where the engines 320 may include the reception engine 202, determination engine 204 coupled to the reception engine 202, and the transmission engine 206 coupled to the determination engine 204. In an example, the engines 320 may be implemented as a combination of hardware and firmware. In examples described herein, such combinations of hardware and firmware may be implemented in several different ways. For example, the firmware for the engine may be processor executable instructions stored on a non-transitory machine-readable storage medium and the hardware for the engine may include a processing resource (for example, implemented as either a single processor or a combination of multiple processors), to execute such instructions.

In the present examples, the machine-readable storage medium may store instructions that, when executed by the processing resource, implement the functionalities of the engine. In such examples, the COS 200 may include the machine-readable storage medium storing the instructions and the processing resource to execute the instructions. In other examples of the present subject matter, the machine-readable storage medium may be located at a different location but accessible to the COS 200 and the COS processor 316.

The COS 200 may further include COS data 322, that serves, amongst other things, as a repository for storing data that may be fetched, processed, received, or generated by the reception engine 202, the determination engine 204, and the transmission engine 206. The COS data 322, among other data, may include reception data 324, determination data 326, transmission data 328. In an example, the COS data 322 may be stored in the COS memory 318.

In operation, the booting engine 106 of the CPE 100 may launch a boot firmware to bootup the CPE 100. On successful bootup of the CPE 100, the booting engine 106 may detect a CPE identifier, such as serial number of the CPE and model number of the CPE.

The booting engine 106 may then activate a wide area network (WAN) port of the CPE 100 to connect the CPE to a communication network of the network operator. Once the CPE is connected to the communication network, the booting engine 106 may detect a network identifier, such as IP subnet associated with the network operator and network operator identifier, such as MCC and MNC.

In an example, upon successful bootup of the CPE 100, the bootup engine 106 may also detect at least one Wireless Access Point (WAP) in the vicinity of the CPE 100. The booting engine 106 may then send a connection request to the at least one WAP. In the example, in response to the connection request, the booting engine 106 may receive Wi-Fi neighbour information from the WAP. In an example, the Wi-Fi neighbour information may include a Received Signal Strength Indicator (RSSI) beacon and an IP subnet of network operator of the at least one WAP. In an example, the booting engine 106 may store the identification parameters in the booting data 314.

The communication engine 102 of the CPE 100 may then access the booting data 314 and transmit the identification parameters to the COS 200.

In an example, a reception engine 202 of the COS 200 may receive the identification parameters from the CPE 100. In the example, the reception engine 202 may store the identification parameters in the reception data 324. The determination engine 204 may then access the identification parameters from the reception data 324 and ascertain presence of an operator specific configuration corresponding to the identification parameters.

The determination engine 204 may have access to a mapping table between a plurality of operator specific configurations and a plurality of identification parameters, where the plurality of identification parameters comprises a plurality of CPE identifiers and a plurality of network identifiers. In an example, the mapping table may include a predetermined number of operator specific configurations corresponding to each of the plurality of network operators, where the predetermined number of operator specific configurations may be different from each other with respect to a type of CPE. The mapping table may be stored in the determination data 326. The determination engine 204 may then access the determination data 326 and identify an operator specific configuration that may be suitable for the CPE 100 and the network operator.

In an illustrative example, identification parameters received from the CPE 100 may include at least one of model number, serial number of the CPE 100, and an IP subnet associated with a first network operator. In the example, the determination engine 204 may determine multiple operator specific configurations corresponding to the first network operator based on the IP subnet. Further, the determination engine 204 may identify an operator specific configuration, from the multiple operator specific configurations, suitable for the CPE 100 based on the model number and/or serial number of the CPE 100. The transmission engine 206 of the COS 200 may then transmit the identified operator specific configuration to the CPE 100.

In an example, before transmitting the operator specific configuration to the CPE 100, the determination engine 204 may verify whether identification parameters have been tampered before transmission to the COS 200. In the example, the determination engine 200 may utilize the Wi-Fi neighbour information to identify a geographic location of at least one neighbour WAP in the vicinity of the CPE 100. The determination engine 204 may then compare the geographic location of at least one neighbour WAP with the identification parameters of the CPE 100. If the geographic location of the at least one neighbour WAP and the identification parameters of the CPE 100 has no correlation, the determination engine 106 may ascertain that the identification parameters have been tampered before transmission to the COS 200. In such a situation, the transmission engine 206 may not transmit the operator specific configuration to the CPE 100.

There may be situations when the determination engine 204 may not find an operator specific configuration corresponding to the identification parameters received from the CPE 100. Such situations may arise, for example, when the CPE 100 is not allowed to be utilized in a particular country. In such a situation, the mapping table won't include any operator specific configuration corresponding to identification parameters associated with network operators operating in the particular country. Accordingly, the determination engine 204 may determine that the CPE 100 is being utilized in a restricted country. In such a situation, the transmission engine 206 may not transmit any operator specification configuration to the CPE 100. Instead, the transmission engine 206 may transmit an indication to block various communication ports of the CPE 100.

In an example, the configuration engine 104 may receive the operator specific configuration in response to transmission of the identification parameters. Accordingly, the configuration engine 104 may configure the CPE 100 based on the operator specific configuration. The operator specific configuration, among other information, may include a management service uniform resource locator (URL) corresponding to the network operator. In the example, the configuration engine 104 may trigger a connection to an Auto Configuration Server (ACS) associated with the network operator based on the management service URL to complete deployment of the CPE 100 at a customer premise.

In another example, the configuration engine 104 may receive an indication to block various communication ports of the CPE 100 in response to transmission of the identification parameters. In the example, the configuration engine 104 may block the communication ports of the of the CPE 100, thereby restricting utilization of the CPE 100.

In an example, the booting engine 106 may detect identification parameters on every bootup of the CPE 100. The booting engine 106 may accordingly compare the identification parameters with previously detected identification parameters stored in the booting data 314. If the booting engine 106 detects any changes in the identification parameters with respect to the previously detected identification parameters, the communication engine 102 may transmit the identification parameters to the COS 200. In an example, the COS 200 may receive the identification parameters, determine another operator specific configuration based on the identification parameters, and transmit the other operator specific configuration for reconfiguration of the CPE 100. In another example, the COS 200 may receive the identification parameters, determine that there exists no operator specific configuration corresponding to the identification parameters, and transmit an indication to block various communication ports of the CPE 100.

Configuring the CPEs with the operator specific configuration dynamically during deployment reduces the time and complexity involved in pre-provisioning different CPEs with different operator specific configurations during manufacturing, thereby reducing the time and complexity involved in manufacturing of the CPEs.

Figure 4:
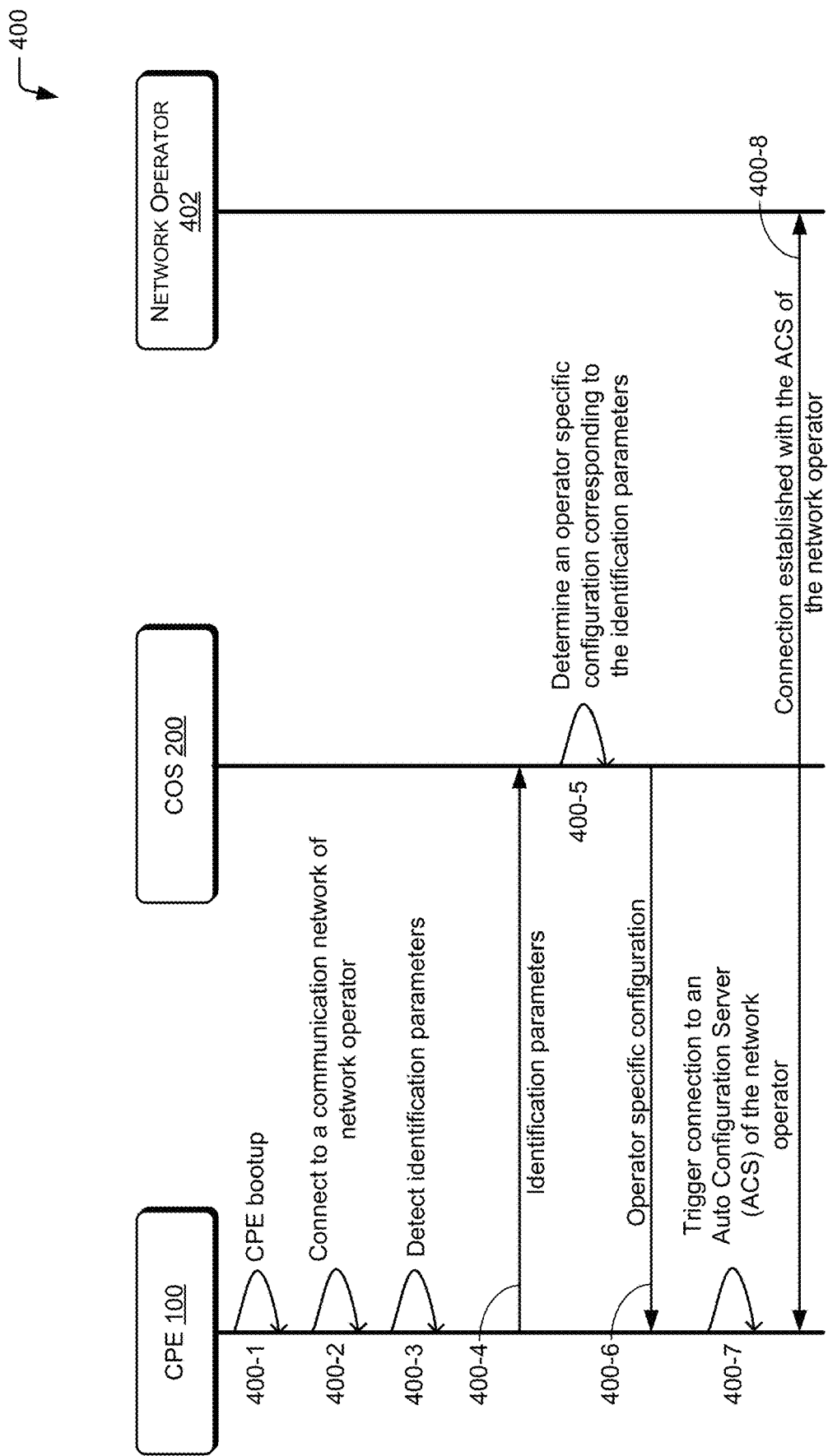
FIG. 4 illustrates a call flow for facilitating dynamic configuration of the CPE, in accordance with an example of the present subject matter.

FIG. 4 illustrates a call flow 400 for communication between the CPE 100 and the COS 200 for facilitating dynamic configuration of the CPE 100, in accordance with an example of the present subject matter.

In the call flow 400, at step 400-1, the CPE 100 may be booted up. In an example, the CPE 100 may be booted up by launching a boot firmware of the CPE 100. At step 400-2, the CPE 100 may be connected to a communication network of a network operator, such as the network operator 402. In an example, a WAN port of the CPE 100 may be activated to connect the CPE to the communication network.

At step 400-3, identification parameters comprising at least one of a CPE identifier and a network identifier may be detected at the CPE 100. Examples of the CPE identifier may include, but are not limited to, serial number of the CPE, a model number of the CPE. Further, examples of the network identifier may include, but are not limited to, an internet protocol (IP) subnet associated with the network operator, network operator identifier such as, Mobile Country Code (MCC) and Mobile Network Code (MNC), and Wi-Fi neighbour information. At step 400-4, the identification parameters may be transmitted from the CPE 100 to the COS 200.

At step 400-5, on reception of the identification parameters from the CPE 100, the COS 200 may determine an operator specific configuration corresponding to the identification parameters. In an example, the CPE 100 may have access to a mapping table between a plurality of operator specific configurations and a plurality of identification parameters, where the plurality of identification parameters comprises a plurality of CPE identifiers and a plurality of network identifiers. In the example, the COS 200 may determine the operator specific configuration corresponding to the identification parameters based on the mapping table between the plurality of operator specific configurations and the plurality of identification parameters. At step 400-6, the COS 200 may transmit the operator specific configuration to the CPE 100. In an example, the operator specific configuration, among other information, may include a management service URL corresponding to the network operator 402.

At step 400-7, the CPE 100 may trigger connection to an ACS of the network operator. In an example, the CPE 100 may trigger connection to the ACS based on the management service URL included in the operator specific configuration. At step 400-8, a connection may be established with the ACS of the network operator and deployment of the CPE 100 may be completed.

Figure 5:
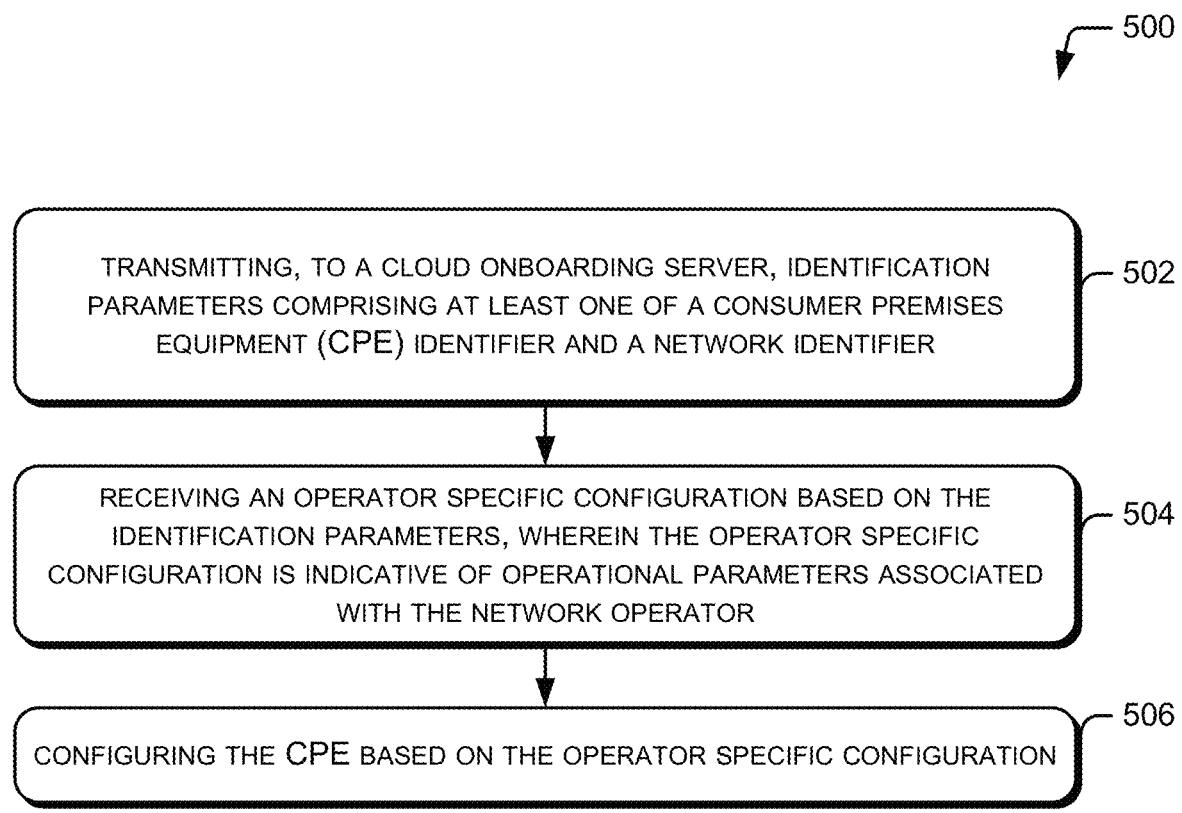
FIG. 5 illustrates a method for facilitating dynamic configuration of the CPE, in accordance with an example of the present subject matter.

FIG. 5 illustrates a method for facilitating dynamic configuration of the CPE, in accordance with an example of the present subject matter. Although the method 500 may be implemented in a variety of devices, but for the ease of explanation, the description of the method 500 is provided in reference to the above-described CPE 100. The order in which the method 500 is described is not intended to be construed as a limitation, and any number of the described method blocks may be combined in any order to implement the method 500, or an alternative method.

It may be understood that blocks of the method 500 may be performed in the CPE 100. The blocks of the method 500 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 502, identification parameters comprising at least one of a CPE identifier and a network identifier may be transmitted to a COS. Examples of the CPE identifier may include, but are not limited to, serial number of the CPE, a model number of the CPE. Further, examples of the network identifier may include, but are not limited to, an internet protocol (IP) subnet associated with the network operator, network operator identifier such as, Mobile Country Code (MCC) and Mobile Network Code (MNC), and Wi-Fi neighbour information. In an example, the identification parameters may be transmitted by the communication engine 102 of the CPE 100.

At block 504, an operator specific configuration corresponding to the identification parameters may be received. The operator specific configuration may indicate operational parameters associated with the network operator. In an example, the operator specific configuration may be received by the communication engine 102 of the CPE 100.

At block 506, the CPE may be configured based on the operator specific configuration. In an example, the operator specific configuration, among other information, may include a management service URL corresponding to the network operator. In the example, a connection between the CPE and an ACS of the network operator may be triggered based on the management service URL included in the operator specific configuration. Subsequently, a connection between the CPE and the ACS of the network operator may be established and the CPE 100 may be deployed at the customer premise.

Figure 6:
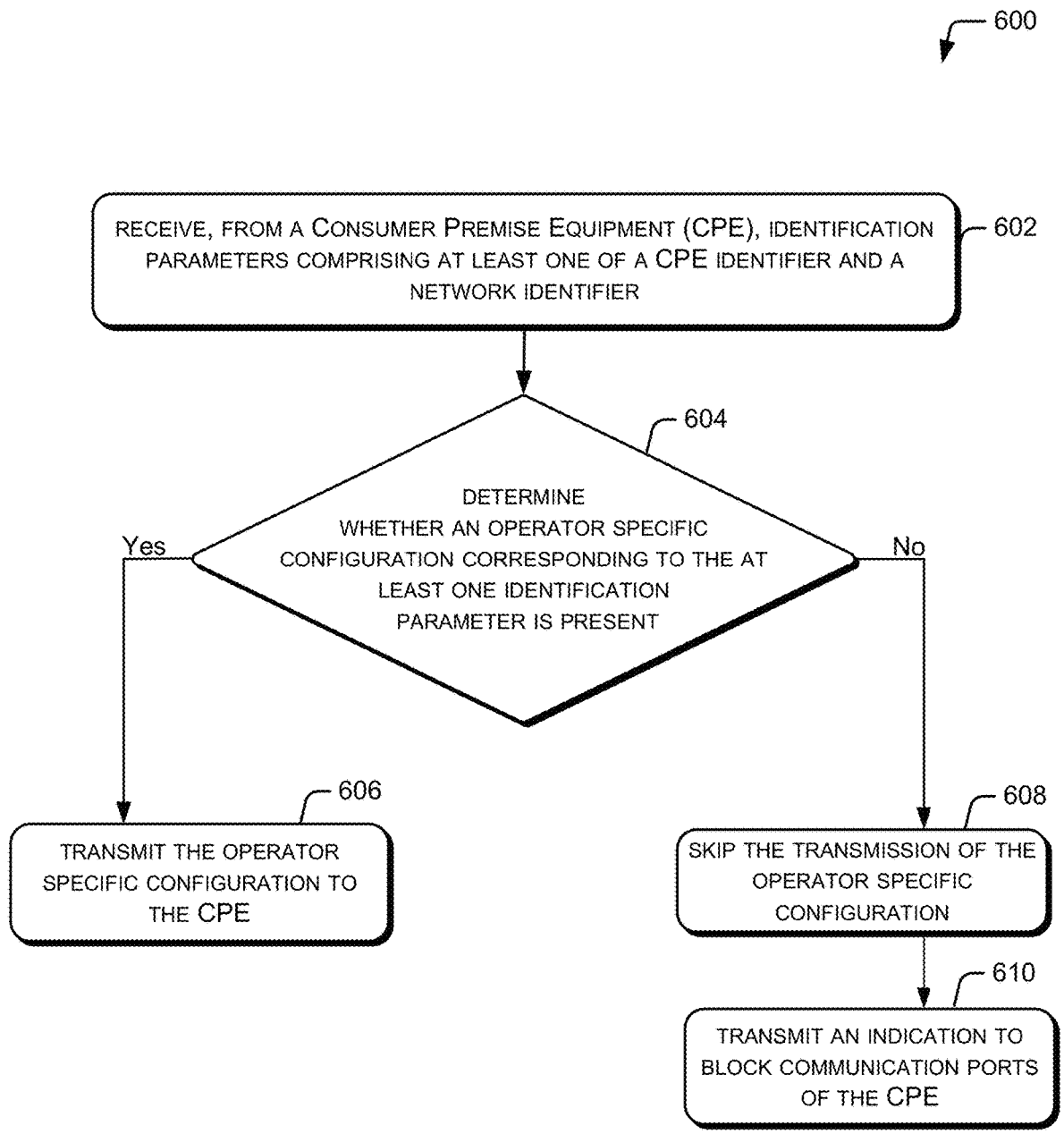
FIG. 6 illustrates another method for facilitating dynamic configuration of the CPE, in accordance with an example of the present subject matter.

FIG. 6 illustrates another method for facilitating dynamic configuration of the CPE, in accordance with an example of the present subject matter. Although the method 600 may be implemented in a variety of devices, but for the ease of explanation, the description of the method 600 is provided in reference to the above-described COS 200. The order in which the method 600 is described is not intended to be construed as a limitation, and any number of the described method blocks may be combined in any order to implement the method 600, or an alternative method.

It may be understood that blocks of the method 600 may be performed in the COS 200. The blocks of the method 600 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 602, identification parameters comprising at least one of a CPE identifier and a network identifier may be received. In an example, the identification parameters may be received from the CPE. In the example, the identification parameters may be received by the reception engine 202 of the COS 200.

At block 604, it may be determined whether an operator specific configuration corresponding to the identification parameters is present. In an example, the operator specific information may be indicative of the operational requirements of the network operator. In the example, presence of the operator specific configuration corresponding to the identification parameters may be determined based on a mapping table between a plurality of operator specific configurations and a plurality of identification parameters, where the plurality of identification parameters comprises a plurality of CPE identifiers and a plurality of network identifiers. If an operator specific configuration corresponding to the identification parameters is found to be present, the method 600 proceeds to block 606. Otherwise, the method 600 proceeds to block 608.

On ascertaining that an operator specific configuration corresponding to the identification parameters is present, the method proceeds to block 606. At block 606, the operator specific configuration may be transmitted to the CPE. In an example, the operator specific configuration may be transmitted by the transmission engine 206 of the COS 200.

On the other hand, on ascertaining that an operator specific configuration corresponding to the identification parameters is absent, the method 600 proceeds to block 608. The operator specific configuration corresponding to the identification parameters may be absent in various situations. For instance, when the CPE is not allowed to be utilized in a particular country, the mapping table won't include any operator specific configuration corresponding to identification parameters associated with network operators operating in the particular country. In such a situation, the method would proceed to block 608, where transmission of the operator specific configuration would be skipped. In such a situation, an indication to block communication ports of the CPE may be transmitted. In an example, the indication to block communication ports of the CPE may be transmitted by the transmission engine 206.

Although examples of the present subject matter have been described in language specific to methods and/or structural features, it is to be understood that the present subject matter is not limited to the specific methods or features described. Rather, the methods and specific features are disclosed and explained as examples of the present subject matter.

We claim:

1. A method comprising:
transmitting, from a Consumer Premises Equipment (CPE) to a Cloud Onboarding Server (COS), identification parameters comprising at least a CPE identifier and a network identifier;
receiving an operator specific configuration based on the identification parameters, wherein the operator specific configuration is indicative of operational parameters associated with a network operator, and the operator specific configuration comprises at least a management service uniform resource locator (URL) corresponding to the network operator; and
configuring the CPE based on the operator specific configuration,
wherein the network identifier comprises an internet protocol (IP) subnet associated with the network operator, a network operator identifier, and Wi-Fi neighbour information.

2. The method as claimed in claim 1, further comprising:
launching boot firmware of the CPE; and
connecting the CPE to a communication network hosted by the network operator, for transmitting the identification parameters.

3. The method as claimed in claim 1, wherein the configuring the CPE further comprises triggering connection to an auto configuration server (ACS) associated with the network operator based on the management service URL.

4. The method as claimed in claim 1, wherein the CPE identifier comprises serial number of the CPE and a model number of the CPE.

5. A method comprising:
receiving, from a Consumer Premise Equipment (CPE), identification parameters comprising at least a CPE identifier and a network identifier;
determining an operator specific configuration based on the identification parameters, wherein the operator specific configuration is indicative of operational parameters associated with a network operator, and the operator specific configuration comprises at least a management service uniform resource locator (URL) corresponding to the network operator; and
transmitting the operator specific configuration to the CPE,
wherein the network identifier comprises an internet protocol (IP) subnet associated with the network operator, network operator identifier, and Wi-Fi neighbour information.

6. The method as claimed in claim 5, wherein the CPE identifier comprises serial number of the CPE and a model number of the CPE.

7. The method as claimed in claim 5, further comprising:
ascertaining presence of the operator specific configuration corresponding to the identification parameters based on a mapping table between a plurality of operator specific configurations and a plurality of identification parameters, wherein the plurality of identification parameters comprises a plurality of CPE identifiers and a plurality of network identifiers; and
transmitting the operator specific configuration.

8. The method as claimed in claim 5, further comprising:
ascertaining absence of the operator specific configuration corresponding to the identification parameters based on a mapping table between a plurality of operator specific configurations and a plurality of identification parameters, wherein the plurality of identification parameters comprises a plurality of CPE identifiers and a plurality of network identifiers; and
skipping transmission of the operator specific configuration.

9. The method as claimed in claim 8, further comprising blocking the CPE on ascertaining the absence of the operator specific configuration in the plurality of operator specific configurations.

10. A Customer Premises Equipment (CPE) comprising:
at least one memory configured to store instructions; and
at least one processor configured to execute the instructions and cause the CPE to,
transmit, to a Cloud Onboarding Server (COS), identification parameters comprising at least a CPE identifier and a network identifier;
receive an operator specific configuration based on the identification parameters, wherein the operator specific configuration is indicative of operational parameters associated with a network operator, and the operator specific configuration comprises at least a management service uniform resource locator (URL) corresponding to the network operator; and
configure the CPE based on the operator specific configuration,
wherein the network identifier comprises an internet protocol (IP) subnet associated with the network operator, a network operator identifier, and Wi-Fi neighbour information.

11. The CPE as claimed in claim 10, wherein the CPE is caused to:
launch boot firmware of the CPE; and
connect the CPE to a communication network hosted by the network operator, for transmitting the identification parameters.

12. The CPE as claimed in claim 10, wherein the CPE is caused to trigger connection to an auto configuration server (ACS) associated with the network operator based on the management service URL.

13. The CPE as claimed in claim 10, wherein the CPE identifier comprises serial number of the CPE and a model number of the CPE.

14. A Cloud Onboarding Server (COS) comprising:
at least one memory configured to store instructions; and
at least one processor configured to execute the instructions and cause the COS to,
receive, from a Consumer Premise Equipment (CPE), identification parameters comprising at least a CPE identifier and a network identifier;
determine an operator specific configuration based on the identification parameters, wherein the operator specific configuration is indicative of operational parameters associated with a network operator, and the operator specific configuration comprises at least a management service uniform resource locator (URL) corresponding to the network operator; and
transmit the operator specific configuration to the CPE,
wherein the network identifier comprises an internet protocol (IP) subnet associated with the network operator, network operator identifier, and Wi-Fi neighbour information.

15. The COS as claimed in claim 14, wherein the CPE identifier comprises serial number of the CPE and a model number of the CPE.

16. The COS as claimed in claim 14, wherein the COS is caused to:
ascertain presence of the operator specific configuration corresponding to the identification parameters based on a mapping table between a plurality of operator specific configurations and a plurality of identification parameters, wherein the plurality of identification parameters comprises a plurality of CPE identifiers and a plurality of network identifiers; and
transmit the operator specific configuration.

17. The COS as claimed in claim 14, wherein the COS is caused to:
ascertain absence of the operator specific configuration corresponding to the identification parameters based on a mapping table between a plurality of operator specific configurations and a plurality of identification parameters, wherein the plurality of identification parameters comprises a plurality of CPE identifiers and a plurality of network identifiers; and
skip the transmission of the operator specific configuration.

18. The COS as claimed in claim 17, wherein the COS is caused to transmit an indication to block communication ports of the CPE on ascertaining the absence of the operator specific configuration in the plurality of operator specific configurations.

* * * * *